Dec. 8, 1959 E. G. CLARK 2,916,638

HIGH SPEED COMPLEMENTING FLIP FLOP

Filed Dec. 28, 1956 2 Sheets-Sheet 1

INVENTOR.
EDWARD GARY CLARK

BY

[signature]

ATTORNEY

Dec. 8, 1959 E. G. CLARK 2,916,638

HIGH SPEED COMPLEMENTING FLIP FLOP

Filed Dec. 28, 1956 2 Sheets-Sheet 2

INVENTOR.
EDWARD GARY CLARK

BY
Walter Schilpp
ATTORNEY 2,916,638
Patented Dec. 8, 1959

2,916,638

HIGH SPEED COMPLEMENTING FLIP FLOP

Edward Gary Clark, Oreland, Pa., assignor to Burroughs Corporation, Detroit, Mich., a corporation of Michigan Application December 28, 1956, Serial No. 631,174

6 Claims. (Cl. 307—88.5)

This invention relates to a bistable electronic circuit commonly referred to as a flip flop. More particularly, the invention relates to a high-speed complementing flip flop incorporating a new form of inhibit gate.

As is well known, a flip-flop circuit will remain in either one of its two stable states until caused to change to its other state by some external force, as by the application of a proper signal. Flip-flop circuits may be either non-complementing or complementing.

A non-complementing flip flop has two input terminals and will change its state only in response to a pulse of given polarity applied to one of its two input terminals; if such a pulse is applied to its other terminal, the flip flop will remain in its resident state.

A complementing flip flop, on the other hand, requires but a single input terminal and, in response to a proper pulse properly applied, will change to its other state irrespective of which one of its two states it was in at the time of the application of the pulse.

A non-complementing flip flop may be converted into a complementing flip flop by the addition of steering or inhibit gates which function to pass the externally applied pulse, or a signal derived therefrom, to a particular one of the two input terminals of the otherwise non-complementing flip-flop circuit which will cause the flip flop to change its state, and to inhibit application of a signal to the other input terminal. For example, in one form of complementing flip flop, two gates are employed one of which at any one time is "enabled" and the other of which is "disabled," according to the state of the flip flop. The gate which is connected to that one of the two input terminals of the flip flop per se which in response to a signal will cause the flip flop to switch is made enabled; the other is disabled. The externally applied pulse, which may be referred to as the input pulse, is applied to both gates, but only the enabled gate passes a signal; the disabled gate inhibits passage of any signal. The signal passed by the enabled gate is effective, in the absence of a signal through the disabled gate, to change the flip flop to its other state.

In such a device as the above, some means must be provided which, in response to the change of state of the flip flop, or in response to some subsequent event, is effective to reverse the status of the gates in anticipation of the arrival of the next input pulse. That is, some means must be provided to disable the enabled gate, and to enable the disabled gate, prior to the application of the next input pulse.

In those complementing flip flops wherein the status of the gates is reversed in response to the change of state of the flip flop, it will be seen that if the gates were permitted to reverse their status prior to the termination of the input pulse, the gate which was disabled at the start of the input pulse would now be enabled and, in response to the continuing input pulse, would pass a signal to the flip flop per se which would again change its state, i.e., would return the flip flop to the state it was in at the time the input pulse was first applied. Thus, the flip flop would continue to change state in an oscillatory manner as long as the input pulse were present, and the final state of the flip flop would be a function of the duration of the input pulse. This action is known as time race.

While time race, in a single flip flop, may be prevented by the employment of delay lines or other means to delay the reversal of the gates for a fixed period of time following the change of state of the flip flop, and then restricting the width of each input pulse to less than the chosen delay period, such a method becomes unsatisfactory where a number of flip flops are cascaded, as in a counter. Here, it becomes necessary to provide pulse standardizers between the stages, or to provide the equivalent internal action limiting the effective duration, or more specifically, the amplitude-time product, of the input pulses. Due to the design tolerances required for the delay and pulse-standardizer circuit, the maximum pulse repetition frequency of a complementing flip flop of the type above described is not as high as it could be were time race not a factor. Accordingly, such circuits are not as fast as is desired for some purposes.

Time race is avoided in some complementing flip-flop circuits by the employment of means which prevent the status of the gates from reversing until the input pulse is over. The action has been referred to as "conditional steering" since the respective status of the steering or inhibit gates is "conditional" upon the removal of the input pulse. While the employment of conditional steering avoids time race, additional components are required to accomplish the conditional steering, and these add to the cost and complexity of the equipment.

An important object of the present invention is to provide a complementing flip-flop circuit of relatively simple design capable of operating at high speed, as for example, at a speed up to ten megacycles.

Another object is to provide a high-speed complementing flip-flop circuit so designed that the steering or inhibit gates may be reversed in response to the change of state of the flip flop without danger of time race.

Another object is to provide a reliable high-speed complementing flip flop not subject to time race and not employing the additional components ordinarily required for conditional steering.

Another object is to provide a transistorized high-speed complementing flip flop employing an improved form of steering or inhibit gate.

Another object is to provide a new form of steering or inhibit gate useful in flip flop and other circuits.

These and other objects are accomplished by employing a gate which when made enabled passes the leading edge or ramp of the applied pulse but prevents passage of the remaining portion of the pulse; of course, when disabled the gate inhibits passage of any portion of the pulse.

While the inhibit gate of the present invention may be used in circuits other than flip flop, as for example, in ring counters, the gate may be employed to particular advantage in a complementing flip flop, and when so employed provides a high speed circuit of good reliability.

In a preferred form of complementing flip flop employing the present invention, the circuit uses six PNP junction transistors of the surface barrier type. Two of these transistors function as the flip flop per se, two others are set-and-reset trigger transistors, and the remaining two function as steering gates.

When the flip flop is in one of its two stable states, the base-emitter junction of the steering-gate transistor of one gate is forward biased while the base-emitter junction of the other is zero biased. When the negative input pulse which is intended to switch the flip flop appears at the input terminal of the circuit, the pulse is applied simultaneously to each of the steering-gate transistors by means of a series capacitor. Each combination of a series capacitor and a steering-gate transistor operates as a differentiating circuit, and functions as a gate. One of the two gates, namely, the gate in which the base-emitter junction of the steering-gate transistor is forward biased, looks to the leading edge of the input pulse like a capacitance connected to ground through the negligibly low collector-to-emitter impedance of a bottomed transistor. The other gate looks to the input pulse like a capacitance connected to ground through the high collector-to-emitter impedance of a biased "off" transistor.

The series capacitor of each gate is chosen to be of small value so that the impedance offered by the capacitor to the rising leading edge or ramp of the applied pulse is large relative to the very low internal collector-to-emitter resistance of that steering-gate transistor whose base-emitter junction is forward biased. In effect, so long as the base-emitter junction is forward biased, the collector of the steering-gate transistor of this gate is clamped to ground, and no part of the input signal effectively reaches the trigger transistor. This gate may therefore be said to be disabled.

The situation at the other gate is, however, different. There, the base-emitter junction of the steering-gate transistor is not forward biased and its collector-to-emitter internal resistance is not low relative to the impedance offered by the series capacitor to the rising leading edge or ramp of the input pulse. Hence, the collector of the steering-gate transistor is not clamped to ground and this gate may, therefore, be said to be enabled. The base-emitter junction of the trigger transistor of this branch becomes forward biased by the leading edge of the input pulse, and since the collector of the trigger transistor is connected to a source of D.-C. voltage, when the base-emitter junction becomes forward biased, collector current flows. Its effect is to raise the collector potential of the trigger transistor. This raises the potential at the base of that one of the flip-flop transistors which had been bottomed, i.e., which had been conducting at saturation. This flip-flop transistor, therefore, turns off, its collector is driven negative, and this has the effect of biasing in the forward direction the base-emitter junction of the other flip-flop transistor which had been cut off. Thus, the flip-flop transistor which had been bottomed is cut off, and the flip-flop transistor which had been cut off is bottomed. It will be seen, then, that the flip-flop has changed its state in response to the input pulse.

When the flip-flop changes its state, the potential at the collector of each flip-flop transistor is the reverse of that which had obtained when the flip-flop was in its previous state. And, since the collector of each flip-flop transistor is connected directly to the base of a different one of the steering-gate transistors, it will be seen that, as a result of the flip-flop changing its state, the biasing on the steering-gate transistors has been reversed. In other words, the steering-gate which had been enabled is now disabled, and the steering gate which had been disabled is now enabled.

There is no danger of time race in the flip-flop circuit of the present invention, provided only that the rise time of the input pulse is not longer in duration than the time required for the flip-flop to change its state. The duration of the input pulse after it has reached its maximum constant amplitude is immaterial so far as time race is concerned, since the series capacitors are effective to block the application of the continuing constant-amplitude portion of the pulse to either trigger transistor. Nor does the trailing edge of the pulse introduce any time race problems, as will be discussed in more detail hereinafter.

In a preferred manner of operating the high speed complementing flip-flop circuit of the present invention, the input pulses are half sine wave pulses whose rise time, i.e., whose leading edge or ramp, is of shorter duration than the time required for the flip-flop transistors to switch.

While the foregoing is a summary, the invention will be best understood from a detailed description of a preferred embodiment taken together with the drawings wherein.

Figures 1, 2:
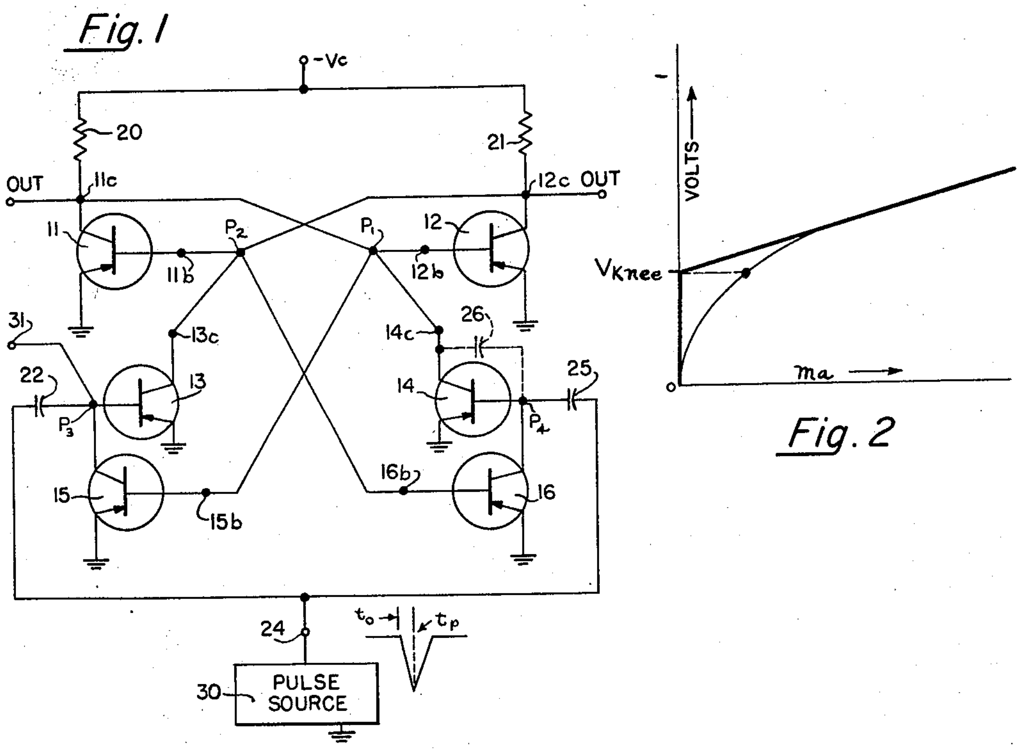
Fig. 1 is a schematic of a high speed transistor complementing flip-flop circuit emboding the present invention.
Fig. 2 shows a typical base characteristic of the transistors used in the circuit of Fig. 1.

Referring now to Fig. 1, there is shown a complementing flip-flop circuit comprising six interconnected PNP junction transistors which are preferably of the surface barrier type L–5129 and which are identified in the drawing by the reference numerals 11 to 16. Transistors 11 and 12 function as the flip flop per se; transistors 13 and 14 function as the set-reset triggers; and transistors 15 and 16 function as steering gates. The emitter of each transistor is connected to a common reference point, such as ground. The collector of the flip-flop transistor 11 is connected directly to the base of the flip-flop transistor 12, also directly to the base of the steering-gate transistor 15, and also directly to the collector of the trigger transistor 14. The common junction of these connections is identified in Fig. 1 as point $p_1$. Similarly, the collector of flip-flop transistor 12 is connected directly to the base of flip-flop transistor 11, directly to the base of steering-gate transistor 16, and directly to the collector of trigger transistor 13. The common junction of these connections is identified in Fig. 1 as point $p_2$. The collectors of the flip-flop transistors 11 and 12 are also connected by way of resistors 20 and 21, respectively, to a common source of negative D.C. voltage, $-V_c$.

The base of trigger transistor 13 is connected directly to the collector of steering-gate transistor 15, and also, by way of coupling capacitor 22, to an input terminal 24. The common junction of these connections is identified in Fig 1 as point $p_3$. Similarly, the base of trigger transistor 14 is connected directly to the collector of transistor 16 and also, by way of coupling capacitor 25, to the input terminal 24. The common junction of these connections is identified in Fig. 1 as point $p_4$. A source 30 of negative pulse voltage is shown connected to the input terminal 24.

The operation of the circuit will first be described more or less generally. Later, the action will be described in greater detail so as to bring out clearly why the circuit is capable of operating at very high speed.

Assume that at a time $t_0$ the transistor 11 is bottomed, i.e., is conducting at saturation. Throughout this specification it will be convenient to describe a transistor which is conducting at saturation as being "bottomed." The collector-to-emitter resistance of a bottomed transistor is negligibly low and throughout this specification it will be assumed that the potential at the collector of a bottomed transistor is equal to that at the emiter. Acually, the potential difference therebetween may be of the order of 0.1 volt.

If we assume, then, that at time $t_0$ the transistor 11 is bottomed, it follows from what has just been said above that its collector 11c is at ground potential. Since the collector 11c is connected, by way of the common junction point $p_1$, directly to the bases 12b and 15b of transistors 12 and 15, respectively, it follows that the bases of these transistors are also at ground potential. And, since the emitters of transistors 12 and 15 are connected to ground, it will be seen that the base-emitter junctions of these transistors are not biased in the forward direction and that the transistors are consequently "off." The transistor 12 being "off," its collector 12c is at the potential of the negative voltage source $-V_c$, and, as the collector of transistor 12 is connected, by way of the common junction $p_2$, directly to the bases 11b and 16b of transistors 11 and 16, respectively, it will be seen that the bases of these transistors are at the potential of the negative voltage source $-V_c$. Accordingly, the base-emitter junctions of transistors 11 and 16 are biased in the forward direction. Flip-flop transistor 11 is thus maintained bottomed. On the other hand, steering-gate transistor 16 although its base-emitter junction is forward biased, cannot conduct in the absence of a negative pulse applied to the input terminal 24. For, until such a negative pulse is applied, the collector circuit of transistor 16 is, in effect, open at the junction point $p_4$.

With flip-flop transistor 11 bottomed and flip-flop transistor 12 cut off, the collector 14c of trigger transistor 14 is at ground potential, while the collector 13c of trigger transistor 13 is at the negative potential of the source $-V_c$.

The foregoing describes the condition of the circuit of Fig. 1 prior to the application of a negative pulse from source 30 to the terminal 24.

When the negative pulse from source 30 is applied to the input terminal 24, it is applied, by way of the capacitor 25, across the collector-to-emitter internal resistance of steering-gate transistor 16 which shunts the base-to-emitter internal resistance of trigger transistor 14. Since the base-emitter junction of steering-gate transistor 16 is forward biased by reason of the negative potential of the collector 12c appearing at the base 16b, the internal collector-to-emitter resistance of transistor 16 is very low relative to the impedance offered to the pulse by capacitor 25. Thus, the base of trigger transistor 14 is effectively clamped to ground by the low collector-to-emitter internal resistance of steering-gate transistor 16 and, as a consequence, substantially all of the pulse voltage appears across the capacitor 25 and substantially none across the base-emitter junction of trigger transistor 14. Hence, upon application of the negative trigger pulse to the input terminal 24, the base of trigger transistor 14 is not driven appreciably negative and transistor 14 remains cut off.

The negative pulse applied to input terminal 24 is also applied, by way of capacitor 22, across the collector-to-emitter internal resistance of steering-gate transistor 15 which is in shunt with the base-to-emitter internal resistance of trigger transistor 13. The base-emitter junction of transistor 15 is zero biased since its base 15b is at ground potential as determined by the collector potential of the bottomed flip-flop transistor 11. Thus, the collector-to-emitter internal resistance of steering-gate transistor 15 is high relative to the impedance offered to the pulse by capacitor 22, and the applied negative voltage pulse therefore drives point $p_3$ negative. The base-emitter junction of trigger transistor 13 is thus forward biased and since its collector 13c is connected to point $p_2$ which is negative, as determined by the "off" state of the flip-flop transistor 12, transistor 13 bottoms, i.e., conducts at saturation. When transistor 13 bottoms, point $p_2$ goes to ground. The forward bias on the base-emitter junction of flip-flop transistor 11 is removed, the transistor 11 cuts off, and its collector 11c falls to the potential of the negative D.-C. voltage source $-V_c$. The base-emitter junction of the other flip-flop transistor 12 thus becomes forward biased and transistor 12 bottoms. Its collector 12c is now at ground potential, and, since the collector 12c is connected directly to the base 11b of flip-flop transistor 11, the forward bias on the base-emitter junction of transistor 11 is maintained. Thus, as a result of the application of the negative trigger pulse to the terminal 24, the flip flop has changed its state, as is seen from the fact that transistor 12 which was originally cut off is now bottomed, and transistor 11 which was originally bottomed is now cut off. The new state is maintained until the next negative trigger pulse from source 30 is applied to the input terminal 24.

With the flip flop in the state just acquired, in which transistor 12 is bottomed and transistor 11 is cut off, the base-emitter junction of steering-gate transistor 15 is now forward biased, since its base is at the negative potential of the collector 11c of the cut-off transistor 11. Transistor 15 does not, however, conduct in the absence of an input pulse, since its collector circuit is open at point $p_3$. The other steering-gate transistor, transistor 16, is now biased off, since its base is connected to the collector of the bottomed transistor 12. Thus, the status of the steering gates is the reverse of that which obtained prior to the change of state of the flip flop.

When the next, i.e., second, negative pulse from source 30 is applied to input terminal 24, the pulse is applied, by way of capacitor 22, across the negligibly low collector-to-emitter internal resistance of steering-gate transistor 15 whose base-emitter junction is forward biased. Thus, the base-to-emitter internal resistance of trigger transistor 13 is shorted out and substantially all of the voltage of the negative pulse appears across the capacitor 22. As a consequence, the pulse is unable to drive the point $p_3$ appreciably negative and trigger transistor 13 remains cut off. The pulse from source 30 is, however, also applied across the relatively high collector-to-emitter internal resistance of the steering-gate transistor 16 which is biased off. This resistance is in shunt with the base-to-emitter internal resistance of trigger transistor 14. The equivalent resistance of these two parallel resistances is high relative to the impedance offered to the pulse by capacitor 25, and, as a consequence, point $p_4$ is driven negative. The trigger transistor 14 then quickly bottoms since its collector 14c is connected by way of point $p_1$, to the negative potential at the collector 11c of "off" transistor 11. When trigger transistor 14 bottoms, the point $p_1$ goes to ground and flip-flop transistor 12 cuts off. Its collector 12c becomes negative and the other flip-flop transistor 11 bottoms. The potential at the collector of transistor 11 is maintained at ground which has the effect of maintaining flip-flop transistor 12 biased off. As a result of this change in the state of the flip flop, the base-emitter junction of steering-gate transistor 16 becomes forward biased whereas that of steering-gate transistor 15 becomes zero biased. It will be observed that this status of the steering-gate transistors is the reverse of that which obtained at the time of the application of the second pulse. The circuit is now in condition to receive the next, i.e., third, pulse from source 30.

Figure 3:
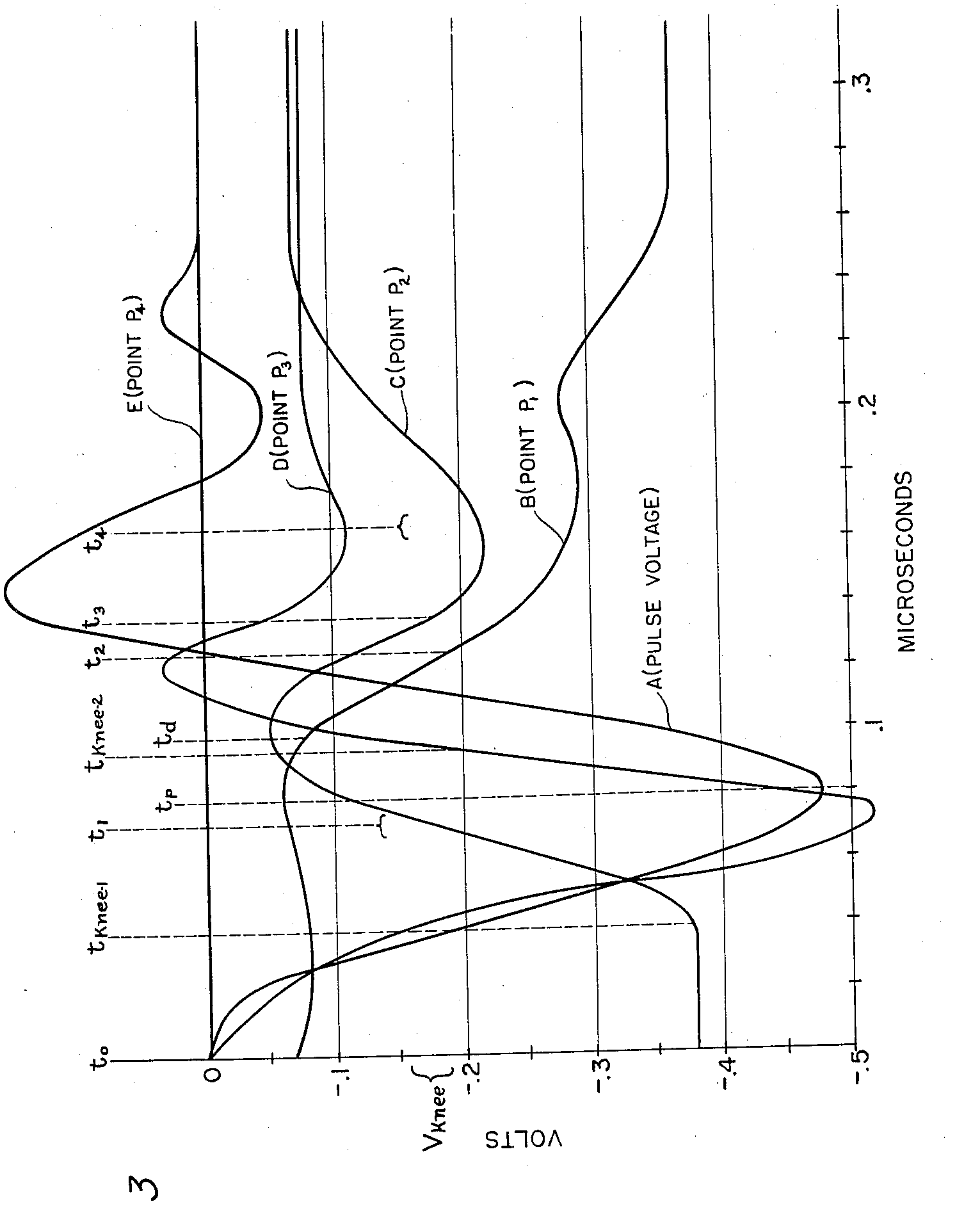
Fig. 3 is a plot of the various waveforms which will be helpful in explaining the operation of the circuit of Fig. 1.

While the foregoing is a more or less general description of the operation of the complementing flip-flop circuit shown in Fig. 1, the detailed action which explains why the circuit is capable of operating at such high speed may be best described with the aid of Fig. 3 wherein various voltage waveforms are shown plotted against time.

Referring now to Fig. 3, curve A is a plot of a 0.12-microsecond voltage pulse applied at a 1-megacycle rate from source 30 to the input terminal 24, curve B is a plot of the voltage at point $p_1$ of Fig. 1 which is also the collector voltage of flip-flop transistor 11, which is assumed to be bottomed at the instant of application of the input pulse, curve C shows the voltage at the point $p_2$ of Fig. 1 which is also the collector of flip-flop transistor 12, which is in cut-off condition at the instant of application of the input pulse, curve D is the voltage at point $p_3$ of Fig. 1 which is the voltage at the base of trigger transistor 13, and curve E is the voltage at point $p_4$ of Fig. 1 which is the voltage at the base of trigger transistor 14.

The curves shown in Fig. 3 are based on a circuit similar to that shown in Fig. 1 in which the capacitors 22 and 25 each had a value of 0.82-micromicrofarads.

Since flip-flop transistor 11 is bottomed, its collector is at ground potential and steering-gate transistor 15 is biased off, whereas the base-emitter junction of steering-gate transistor 16 is forward biased since flip-flop transistor 12 is cut off and its collector is at the negative potential $-V_c$. Consequently, when the negative voltage pulse represented by curve A is applied, starting at the time $t_o$, the voltage at point $p_4$ at the base of trigger transistor 14, represented by curve E, remains substantially zero, while that at point $p_3$ at the base of transistor 13, represented by the curve D, follows that of the applied pulse.

For the voltages at the base of the trigger transistors 13 and 14 to be as shown in Fig. 3 and as indicated above, two conditions must be satisfied. First, the applied pulse must be such that the impedance offered to the pulse by the capacitor 25 is large relative to the impedance of the parallel paths comprising the collector-to-emitter resistance of an "on" transistor and the base-to-emitter resistance of an "off" transistor. Where this condition is met, the voltage at the base of the trigger transistor 14, identified in Fig. 1 as point $p_4$, is represented by Equation 1 as follows:

$$V_4=R_4C_{25}\frac{dV_{in}}{dt}=R_4C_{25}K \quad (1)$$

Where:

$V_4$=the voltage at point $p_4$
$R_4$=the impedance to ground from the point $p_4$
$C_{25}$=the capacitance of the capacitor 25
$V_{in}$=the input pulse voltage The second condition to be satisfied is that the impedance offered by capacitor 22 be small relative to the impedance of the parallel paths comprising the collector-to-emitter resistance of an "off" transistor and the base-to-emitter resistance of an "off" transistor. Where this condition is met, the voltage at the base of trigger transistor 13, identified in Fig. 1 as point $p_3$, is represented by Equation 2 as follows:

$$V_3=R_3C_{22}K(1-e^{-t/R_3C_{22}}) \quad (2)$$

Where:

$V_3$=the voltage at point $p_3$
$R_3$=the impedance to ground from the point $p_3$
$C_{22}$=the capacitance of the capacitor 22

It will now be helpful to refer momentarily to Fig. 2 wherein is shown a typical base characteristic of a PNP junction transistor whose emitter is grounded. Also shown in Fig. 2 is a straight line approximation which establishes a point which may be identified as the "knee" of the curve. Until the negative voltage on the base reaches the knee of the characteristic, the resistance of the base-emitter junction is very high and may be assumed to be infinite.

In recognition of the non-linear nature of the base characteristic, as shown in Fig. 2, the respone defined by Equation 2 above may be divided into two intervals in each of which the base characteristic is approximated by a straight line. Until the time $t_{knee-1}$ shown in Fig. 3, and which is defined as that time when the voltage at point $p_3$ at the base of the trigger transistor 13 reaches the knee of its characteristic, the resistance from point $p_3$ to ground is assumed infinite. In the interval between time $t_{knee-1}$ and time $t_p$ (Fig. 3). where $t_p$ is defined as that time up to which the input pulse voltage may be approximated by a straight line, the resistance is the slope of the characteristic curve. Under these assumptions, the Equation 2 above may be rewritten as Equations 3*a* and 3*b* as follows:

$$V_3=V_{in}=Kt \qquad t_o<t_{knee-1} \quad (3a)$$

$$V_3=V_{knee-1}+RCK(1-e-(t_o-t_{knee-1})/RC)t_{knee-1}<t_p \quad (3b)$$

Returning again to Fig. 3, before using the curves there shown to describe in detail the high speed action of the circuit of Fig. 1, the time instants and time intervals indicated in Fig. 3 will be defined. Some of these have already been indicated, but for completeness and ready reference will again be defined: $t_o$ is the time at which the negative input pulse is first applied to the input terminal 24; the interval between $t_o$ and $t_p$ represents the time during which the input pulse voltage may be approximated by a straight line; the interval between $t_o$ and $t_{knee-1}$ is the time during which the applied pulse voltage is too small, i.e., is not sufficiently negative, to drive point $p_3$ beyond the knee of the base characteristic of the trigger transistor 13, the knee being located at about $-0.16$ volt (see curve A); the interval between $t_{knee-1}$ and $t_1$ represents the time during which the voltage on the base of the flip-flop transistor 11, which is being turned off, is dropping down, i.e., is decreasing negatively, to the knee of its base characteristic (see curve C); the time interval $t_1$ to $t_d$ is the hole storage delay interval of the flip-flop transistor 11, which is turning off (see curve C); the interval $t_d$ to $t_2$ is the time taken for the voltage on the collector of the flip-flop transistor 11, which is turning off, to decrease, i.e. to move negatively, to the knee of the base characteristic of the other flip-flop transistor 12 which is turning on (see curve B); the time interval $t_3$ to $t_4$ is the time taken for the current of the collector of the flip-flop transistor 12, which is turning on, to build up to a value such that, without the aid of trigger transistor 13, the voltage at the collector of transistor 12 is maintained more positive than that at the knee of the base characteristic curve of the transistor 11, which is turning off (see curve C). In Fig. 3, the knee of the base characteristic of each of the transistors used in the circuit of Fig. 1 occurs at about $-0.16$ volt to $-0.19$ volt.

With the aid of Fig. 3, the sequence of operations involved in the flip flop action will now be described in detail. It will be seen that in the interval between time $t_o$ and $t_{knee\text{-}1}$, the voltage at the point $p_3$, i.e., at the base of the trigger transistor 13, represented by the curve D, follows that of the applied input pulse voltage represented by the curve A. The voltage in the same interval at point $p_4$, i.e., at the base of trigger transistor 14, represented by the curve E, is substantially zero. At time $t_{knee\text{-}1}$, the Equation 3*b* given above defines the voltage at point $p_3$ and base current begins to flow in the trigger transistor 13, and due to this base current, collector current flows. This is shown in Fig. 3 (curve C) as a rise in voltage at point $p_2$ which is also the voltage at the collector of transistor 12. As long as there is a sufficiently negative base voltage at point $p_3$ (curve D), the voltage at point $p_2$ (curve C) will keep rising until the trigger transistor 13 is bottomed. The flip-flop transistor 11 begins to turn off at time $t_1$ which is the time when the voltage at point $p_2$ (curve C) is at the knee of the base characteristic of the transistor 11. The voltage at point $p_1$ (curve B), which is also the voltage at the collector of transistor 11, does not, however, begin to drop until the time $t_d$, where the time interval between time $t_1$ and time $t_d$ is the delay due to hole storage in transistor 11. When the voltage at point $p_1$ (curve B), which is the voltage at the collector of transistor 11 and also at the base of transistor 12, drops sufficiently to go below the knee of the base characteristic of flip-flop transistor 12, the transistor 12 will be turned on and its collector current will aid the trigger transistor 13 in turning off the flip-flop transistor 11. Up to the time $t_2$, the responsibility of turning the flip-flop transistor 11 off rested on the trigger transistor 13 alone. However, when the base of transistor 12 (point $p_1$) is driven below the knee of its base characteristic (curve B), the collector current of the flip-flop transistor 12 becomes sufficient to maintain its collector at a higher (more positive) voltage than the knee of the base characteristic of transistor 11 (curve C) and it is then no longer necessary for the trigger transistor 13 to draw collector current. The curves of Fig. 3 depict the marginal case where the trigger transistor 13 is on just long enough to insure switching of the flip flop.

It will be seen that at time $t_{knee-2}$ when the voltage at the base of trigger transistor 13 (point $p_3$) moves above, i.e., becomes more positive than, the knee of its base characteristic, the potential at its collector (point $p_2$) which is also the potential at the base of flip-flop transistor 11, starts moving in a negative-going direction, and that at time $t_3$, the potential at point $p_2$, drops below, i.e., becomes more negative than, the knee of the characteristic of flip-flop transistor 11. At this same instant, time $t_3$, the potential at point $p_1$, which is the base of flip-flop transistor 12, is also below, i.e., more negative than, the knee of the base characteristic of the flip-flop transistor 12. Transistor 12 is now conducting strongly and the potential at its collector (point $p_2$) is driven toward ground, which biases off the transistor 11. Thus, the transistor 12 bottoms and the transistor 11 cuts off.

It will be seen from curve D at time $t_{knee-2}$ that even though the negative voltage applied to the base of the trigger transistor 13 becomes smaller, i.e., becomes more positive, than the knee voltage of the trigger transistor base characteristic, the hole storage time and the decay time of its collector current together are sufficient to keep the base potential of flip-flop transistor 11 above, i.e., more positive than, the knee of its base characteristic for a sufficient time to permit the collector current of the flip-flop transistor 12 to become large enough to insure biasing "off" of transistor 11 and thus to insure switching.

It would seem that the time period during which the trigger transistor 13 is required to remain on is the interval between $t_{knee-1}$ and $t_4$. This does not mean, however, that the voltage on the base of the trigger transistor 13 (curve D) must necessarily remain below, i.e., more negative than, the knee of its base characteristic during this interval of time. For, switching is assured if, during the hole storage time of trigger transistor 13, and for part of the fall time, i.e., for part of the time during which the voltage at the collector of the trigger transistor 13 (point $p_2$) is going negative, the last voltage, which is also the voltage at the collector of the flip-flop transistor 12, which is turning on, is above, i.e., is more positive than, the voltage at the knee of the base characteristic of the transistor 11, which is turning off.

The time and the voltage required are functions of the transistors themselves. If the input pulse is sufficiently long with respect to the response of the transistors, then the entire flip-flop action may take place before the voltage on the base of the trigger transistor has risen above, i.e., has become more positive than, the knee of the base characteristic. When this is the case, the decay of the base voltage on the trigger transistor will first be through its base-to-emitter resistance (which may be of the order of 250 ohms) and then through the collector-to-ground resistance of an "on" transistor (which is of the order of 50 ohms). Where the width of the input pulse is not long enough for the sequence of operations between $t_{knee-1}$ and $t_4$ to take place while voltage is still being applied to the base, as is the case illustrated in the curves of Fig. 3, the question of whether or not flip flop action is obtained independent on the hole storage and base-voltage decay time of the trigger transistor.

It has been found that, when triggering with a pulse of given width, an increase in voltage beyond a certain minimum will not change the state of switching to which the flip flop has progressed at a given time. This means that, when the pulse duration is less than the time interval between $t_{knee-1}$ and $t_4$, a minimum value of pulse voltage is more than enough to turn on the transistor as fast as possible and is critical in the sense that it must be sufficient to build up the proper hole storage time in the trigger transistor.

Figure 4:
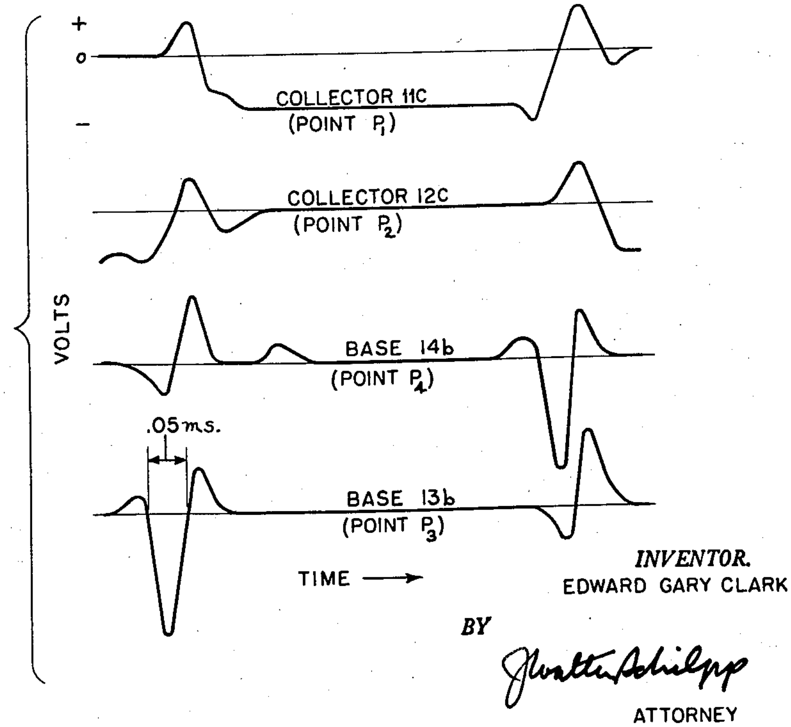
Fig. 4 shows waveforms obtained when the circuit of Fig. 1 is operated at a speed of 10-megacycles.

The flip-flop circuit of Fig. 1 was also operated using an input pulse whose duration was only 0.05-microsecond. These pulses were applied at a 10-megacycle repetition rate. The waveforms obtained are shown in Fig. 4. It will be seen from these waveforms that, due to the fast rise time and short duration of the 0.05-microsecond pulse, the sequence of events taking place in the circuit of Fig. 1 is slightly different than in the case where pulses of somewhat slower rise time and longer duration are used, as has already been described in connection with the curves shown in Fig. 3.

The operation of the flip flop circuit of Fig. 1 when driven at a 10-megacycle rate by 0.05-microsecond pulses, will now be described. It will again be assumed that prior to the application of the pulse, the flip-flop transistor 11 is "on" and the flip-flop transistor 12 is "off." As a consequence, the steering-gate transistor 15 is biased "off," and the steering-gate transistor 16 is biased "on" but is not conducting since its collector is open at point $p_4$. When the 0.05-microsecond pulse is applied to the input terminal 24, the trigger transistor 13 is turned on, the voltage at its collector (point $p_2$) goes to ground, and the flip-flop transistor 11 turns off. It will be recalled that in the case of the 0.12-microsecond input pulse discussed in connection with Fig. 3, the transistor 11 was observed to go off by a drop in the voltage at its collector (point $p_1$) as is shown in curve B of Fig. 3. However, with a pulse having the fast rise time and short duration of a 0.05-microsecond pulse, the voltage at the collector of the transistor 11 first goes positive, as is shown in Fig. 4. The explanation is as follows: At the time flip-flop transistor 11 turns off, the steering-gate transistor 16 also turns off. Hence, the resistance from point $p_4$ to ground is no longer negligibly low. As a consequence, the positive-going swing at the end of the applied negative voltage pulse is coupled through the base-to-collector inherent capacitance of the trigger transistor 14, represented in Fig. 1 by the dotted-capacitance 26, to the point $p_1$ which is also the collector of the flip-flop transistor 11. As a result of the action just described, both of the flip-flop transistors 11 and 12 are "off" but the voltage at the collector of each transistor is momentarily positive. When the input pulse terminates, the voltage at the collector 11c of the flip-flop transistor 11 decays rapidly, as the capacitance 26 discharges. The voltage at the collector 12c of transistor 12 also moves in a negative direction but is prevented from going too far negative due to the trigger transistor 13 which, due to hole storage and decay time, is still capable of holding the point $p_2$ at or near ground. When the voltage swing at the collector 11c becomes sufficiently negative, it will turn on the flip-flop transistor 12, and the flip flop will have changed its state, i.e., the flip flop will have been complemented.

For counter-type operation, the output from the base of one of the trigger transistors may be used, as is indicated in Fig. 1 by the output terminal 31. The advantage of operating from this point is the fast propagation time of the trigger pulse and the larger voltage swing.

The high-speed complementing flip-flop circuit shown in Fig. 1 has been found to work reliably up to 10-megacycles at 30° centigrade using L5129 transistors. The upper frequency of operation decreases with temperature. The limit to the frequency of operation depends upon the transistors themselves because the minimum time required to trigger is the time required for the transistors to perform a series of operations. The type of trigger pulse used to drive the circuit, especially the rate of change of voltage, is very important, depending on the properties of the transistor.

For maximum trigger operation, the limiting factor is defined by Equation 1, given above, which represents the voltage across the base of the trigger transistor which is not to be turned on. The Equation 1 shows that the base voltage of the trigger transistor which is not to be turned on is a function of the derivative of the input pulse voltage. A maximum input pulse level is reached, however, because, with pulse generators, as the pulse amplitude is increased, the rate of rise of the voltage increases also. Under the assumption that the rate of rise of the pulse voltage will be a function of the pulse amplitude, the important transistor parameter to be considered for maximum trigger conditions, is the collector-to-ground resistance. This should be as small as possible when the transistor is on.

As indicated previously in the summary of the invention, the high-speed complementing flip flop of the present invention is not subjected to the danger of time race provided only that input pulses of such fast rise time be employed that the rise or ramp portion of the pulse is over by the time the flip flop has shifted. For example, if the flip flop shifts in 0.1-microsecond, it is necessary that the rise time of the input pulse be less than 0.1-microsecond. That this is necessary in order to avoid time race is seen from the following: Assume that the flip flop has just shifted from the state in which transistor 11 is bottomed to the state in which transistor 11 is cut off. If this shift is made before the ramp of the negative input pulse terminates, the continuation of the negative-going rising edge of the pulse will pass through the capacitor 25 and, since the steering-gate transistor 16 which had initially been bottomed is now cut off, the base of the trigger transistor 14 will be driven negative, the trigger transistor 14 will bottom, and this will cause flip-flop transistor 12, which had just been turned on, to turn off. It will thus be seen that, due to the continuation of the ramp portion of the applied pulse for a time period longer than that required for the flip flop to change its state, time race is introduced.

Time race does not occur, however, if at the time the flip flop shifts, the ramp portion of the pulse has ended. For example, if the input pulse be a square negative pulse, it is immaterial that the flat top portion may continue after the flip flop has shifted, since the capacitors 22 and 25 present a very high impedance to this portion of the pulse and no substantial part of the pulse voltage appears on the base of the trigger transistor even though its associated steering-gate transistor is biased off. Moreover, when the assumed long-duration square negative pulse terminates, the positive-going trailing ramp attempts unsuccessfully to produce a positive spike at the base of that trigger whose steering gate is disabled, i.e., whose steering-gate transistor is bottomed, since the base of this trigger transistor is clamped to ground. At the same time, on the other side of the circuit, the positive-going trailing ramp of the negative pulse passes through the series capacitor and drives positive the base of that trigger transistor whose steering gate is enabled, i.e., whose steering-gate transistor is biased off. Such positive voltage is, however, of a polarity to cut off the trigger transistor. But this trigger transistor is already cut off, having been cut off at the time the negative-going leading ramp of the pulse ended.

Thus, the flip flop circuit of the present invention is not subject to time race even though the input pulses continue after the flip flop has shifted, provided that the rise time of the input pulse is not longer than the time required for the flip flop to shift.

It will be seen from the foregoing that the present invention provides a transistor high-speed complementing flip flop of simple construction which does not require for freedom from time race, the additional components conventionally required for conditional steering. Moreover, the flip-flop circuit of the present invention may be cascaded without the employment of interstage pulse standardizers or their equivalent as is ordinarily required when conventional non-conditionally steered flip-flop circuits are connected in cascade.

It will be understood that while PNP conduction-type transistors have been shown and described, the circuit will also operate using NPN transistors, in which case it will be necessary to reverse the polarity of the applied pulse and of the supply voltage.

What is claimed is:

1. A complementing flip flop comprising: six junction transistors each having emitter, base and collector, the emitter of each transistor being connected to ground, the first and second of said transistors functioning as the flip flop per se, the third and fourth of said transistors functioning as set-reset trigger transistors, and the fifth and sixth of said transistors functioning as steering gates; means connecting the base of each of said flip-flop transistors directly to the collector of the other of said flip-flop transistors; means connecting the collector of each of said trigger transistors directly to the base of a different one of said flip-flop transistors; means connecting the collector of each of said steering-gate transistors directly to the base of a different one of said trigger transistors; means connecting the base of each of said steering-gate transistors directly to the collector of one of said trigger transistors, said one being other than the one to the base of which the collector of said steering-gate transistor is connected; resistive means connecting the collector of each of said flip-flop transistors to a common source of direct-current voltage; and capicitor means connecting the base of each of said trigger transistors to a common source of pulse voltage, the impedance of each of said capacitors to the leading edge of said pulse voltage being large relative to the collector-to-emitter impedance of a steering-gate transistor when biased to conduct at saturation, the impedance of each of said capacitors to the leading edge of said pulse voltage being small relative to the collector-to-emitter impedance of a steering-gate transistor when biased off.

2. A complementing flip flop comprising: a pair of interconnected junction transistors functioning as the flip flop per se, the base of each of said flip-flop transistors being connected directly to the collector of the other, the emitter of each flip-flop transistor being connected to ground, the collector of each flip-flop transistor being resistively connected to a common source of direct-current voltage; a pair of junction transistors functioning as trigger devices, the collector of each trigger transistor being connected directly to the base of a different one of the said flip-flop transistors, the emitter of each trigger transistor being connected to ground; a pair of junction transistors functioning as steering gates, the collector of each steering-gate transistor being connected directly to the base of a different one of the said trigger transistors, the emitter of each steering-gate transistor being connected to ground, the base of each steering-gate transistor being connected directly to the collector of one of said trigger transistors, said one being other than the one to the base of which the collector of said steering-gate transistor is connected; a first capacitor for connecting a voltage pulse source to the base of one of said trigger transistors; and a second capacitor for connecting said same voltage pulse source to the base of the other of said trigger transistors, the value of each of said capacitors being such that its impedance to the leading edge of said voltage pulse is large relative to the collector-to-emitter internal impedance of an "on" steering-gate transistor but small relative to the collector-to-emitter internal impedance of an "off" steering-gate transistor.

3. A complementing flip flop comprising: a first pair of grounded-emitter junction transistors functioning as the flip flop per se, each of said flip-flop transistors having its base connected directly to the collector of the other flip-flop transistor; resistance means for connecting a source of direct-current potential to the collector of each of said flip-flop transistors; a second pair of grounded-emitter junction transistors functioning as trigger devices, the collector of each of said trigger transistors being connected directly to the base of a different one of said flip-flop transistors; a third pair of grounded-emitter junction transistors functioning as steering-gates, the base of each of said steering-gate transistors being connected directly to the base of a different one of said flip flop transistors, the collector of each of said steering-gate transistors being connected directly to the base of that trigger transistor whose collector is connected to the base of a flip-flop transistor other than that to which the base of said steering-gate transistor is connected; and capacitance means for connecting a source of pulse voltage across the base-to-emitter junction of each of said trigger transistors, the value of said capacitance means being such that the impedance offered thereby to the leading edge of said voltage pulse is large relative to the collector-to-emitter impedance of a steering-gate transistor whose base-emitter junction is forward biased but is small relative to the collector-to-emitter impedance of a steering-gate transistor whose base-emitter junction is zero biased.

4. A complementing flip flop comprising: a first pair of junction transistors functioning as the flip flop per se, said flip-flop transistors being so interconnected that the collector-to-emitter resistance of each of said flip-flop transistors is in shunt with the base-to-emitter resistance of the other flip-flop transistor; resistance means for connecting a source of direct-current voltage across the base-emitter junction of each of said flip-flop transistors; a second pair of junction transistors functioning as triggers, the collector-to-emitter resistance of each of said trigger transistors being connected across the base-emitter junction of a different one of said flip-flop transistors; a third pair of transistors functioning as steering gates, the collector-to-emitter resistance of each of said steering-gate transistors being connected across the base-emitter junction of a different one of said trigger transistors; means for connecting the base of each steering-gate transistor directly to the collector of one of said trigger transistors, said one being other than the one across the base-emitter junction of which the collector-to-emitter resistance of said steering-gate transistor is connected; and alternating-current coupling means for connecting a source of pulse voltage across the collector-to-emitter resistance of each of said steering-gate transistors, said alternating-current coupling means being such that the impedance offered thereby to the leading edge of said voltage pulse is large relative to the collector-to-emitter impedance of a steering-gate transistor whose base-emitter junction is forward biased but is small relative to the collector-to-emitter impedance of a steering-gate transistor whose base-emitter junction is zero biased.

5. A complementing flip flop comprising: first and second transistors having their respective bases and collectors interconnected to form a bistable flip flop; third and fourth transistors functioning as set-reset triggers, the collector-to-emitter of said third transistor being connected across the base-emitter junction of said first transistor, and the collector-to-emitter of said fourth transistor being connected across the base-emitter junction of said second transistor; fifth and sixth transistors functioning as steering gates, the collector-to-emitter and said fifth transistor being conneced across the base-emitter junction of said third transistor, the collector-to-emitter of said sixth transistor being connected across the base-emitter junction of said fourh transistor; means connecting the base of said fifth transistor directly to the base of said second transistor; means connecting the base of said sixth transistor directly to the base of said first transistor; resistance means for connecting the collectors of each of said first and second transistors to a source of direct-current voltages; first alternating-current coupling means for connecting a voltage pulse source across the base-emitter junction of said third transistor; and second alternating-current coupling means for connecting said same voltage pulse source across the base-emitter junction of said fourth transistor, the impedance offered to the leading edge of said pulse voltage by each said first and second alternating-current coupling means being large relative to the collector-to-emitter resistance of a steering-gate transistor that is biased "on" but small relative to the collector-to-emitter resistance of a steering-gate transistor that is biased "off."

6. A complementing flip-flop circuit comprising: a pair of grounded-emitter transistors having their respective bases and collectors cross-coupled to form a flip flop, one of said transistors being bottomed and the other being biased off when said flip flop is in one of its two stable states, said other transistor being bottomed and said one transistor being biased off when the flip flop is in the other of its stable states; a pair of grounded-emitter trigger transistors, the collector of one trigger transistor being connected to the base of one flip-flop transistor to bias off said one flip-flop transistor when said one trigger transistor is bottomed and the collector of the other trigger transistor being connected to the base of the other flip-flop transistor to bias off said other flip-flop transistor when said other trigger transistor is bottomed; a pair of grounded-emitter steering-gate transistors, the collector of one of said steering-gate transistors being connected to the base of one trigger transistor to inhibit the bottoming of said one trigger transistor when said one steering-gate transistor is bottomed, the collector of the other of said steering-gate transistors being connected to the base of the other trigger transistor to inhibit the bottoming of said other trigger transistor when said other steering-gate transistor is bottomed; means for connecting the bases of said one and other steering-gate transistors to the collector of said one and other flip-flop transistors respectively so that said one steering-gate transistor is biased off and said other steering-gate transistor is biased on when said one flip-flop transistor is bottomed and so that said one steering-gate transistor is biased on and said other steering-gate transistor is biased off when said other flip-flop transistor is bottomed; an input terminal for receiving pulse signals; and a pair of parallel paths, each path including a series capacitor one plate of which is connected directly to the base of a trigger transistor, for bottoming, in response to the leading edge of an input pulse, that one of said trigger transistors not inhibited by that steering-gate transistor which is biased on, thereby to bias off that flip-flop transistor which was bottomed and thereby to shift the flip flop to its other state.

References Cited in the file of this patent

UNITED STATES PATENTS

| | | |
|---|---|---|
| 2,620,448 | Wallace | Dec. 2, 1952 |
| 2,622,212 | Anderson et al. | Dec. 16, 1952 |
| 2,644,887 | Wolfe | July 7, 1953 |
| 2,644,896 | Lo | July 7, 1953 |
| 2,719,228 | Auerbach et al. | Sept. 27, 1955 |
| 2,845,548 | Silliman et al. | July 29, 1958 |

OTHER REFERENCES

Calvalieri publication: "Whats Inside Transac?" publication July 1956, 7 pages, published by Philco Corporation.

Beter et al.: "Directly Coupled Transistor Circuits," publication, June 1955, also in Electronics, June 1955, pages 132–136, McGraw-Hill Pub. Co.